(12) United States Patent
Chang

(10) Patent No.: US 8,047,833 B2
(45) Date of Patent: Nov. 1, 2011

(54) INJECTION MOLD

(75) Inventor: Chia-Chun Chang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 14 days.

(21) Appl. No.: 12/639,202

(22) Filed: Dec. 16, 2009

(65) Prior Publication Data

US 2010/0272848 A1 Oct. 28, 2010

(30) Foreign Application Priority Data

Apr. 20, 2009 (CN) .......................... 2009 10 301892

(51) Int. Cl.
*B29C 45/63* (2006.01)
(52) U.S. Cl. .................. 425/330; 425/450.1; 425/451.9; 425/812
(58) Field of Classification Search .................. 425/330, 425/450.1, 451.9, 812
See application file for complete search history.

(56) References Cited

U.S. PATENT DOCUMENTS 5,780,068 A * 7/1998 Shinohara ..................... 425/168
6,367,765 B1 * 4/2002 Wieder ......................... 249/141

* cited by examiner

*Primary Examiner* — Timothy Heitbrink
(74) *Attorney, Agent, or Firm* — Altis Law Group, Inc.

(57) ABSTRACT

An injection mold for molding a lens barrel is disclosed. The injection mold includes a female die, a male die and a screw die. The female die and the male die are correspondingly connected to two ends of the screw die. The female die, the male die and the screw die cooperatively define a mold cavity. The female die includes a female die plate and a female die core protruding from the female die plate. The male die includes a male die plate and a male die core protruding from the male die plate. The male die defines a through hole passing through the male die plate and the male die core. An air gap is formed between the distal ends of female die core and the male die core, the air gap is communicated with the mold cavity and the through hole.

6 Claims, 2 Drawing Sheets

INJECTION MOLD

BACKGROUND

1. Technical Field

The present disclosure relates to injection molds, particularly, to an injection mold for molding a lens barrel of a camera module.

2. Description of Related Art

In a camera module, a lens barrel is configured for receiving lenses, spacers, etc. Referring to FIG. 2, a typical lens barrel 100 includes a cylindrical side wall 10, an end wall 20 connected to an end of the side wall 10. The side wall 10 defines a receiving space 101 for receiving lenses etc. The end wall 20 defines a light-incident hole 201 communicating with the receiving space 101 of the side wall 10. Nowadays, such a lens barrel 100 is mainly manufactured by injection molding. The injection mold includes a female die and a male die. The female die and the male die together define a molding cavity therebetween. The lens barrel 100 is formed in the molding cavity. The light-incident hole is formed at a portion where the female die and the male die join together. However, the joint is typically positioned at a central portion of the mold cavity. When the lens barrel 100 is being molded, the air in the mold cavity may not be totally exhausted and remain near the joint. Thus, the obtained light-incident hole may not be shaped as designed. As a result, imaging function of a camera module with the lens barrel will be deteriorated.

What is needed, therefore, is an injection mold to overcome the above mentioned problems.

DETAILED DESCRIPTION

Figure 1:
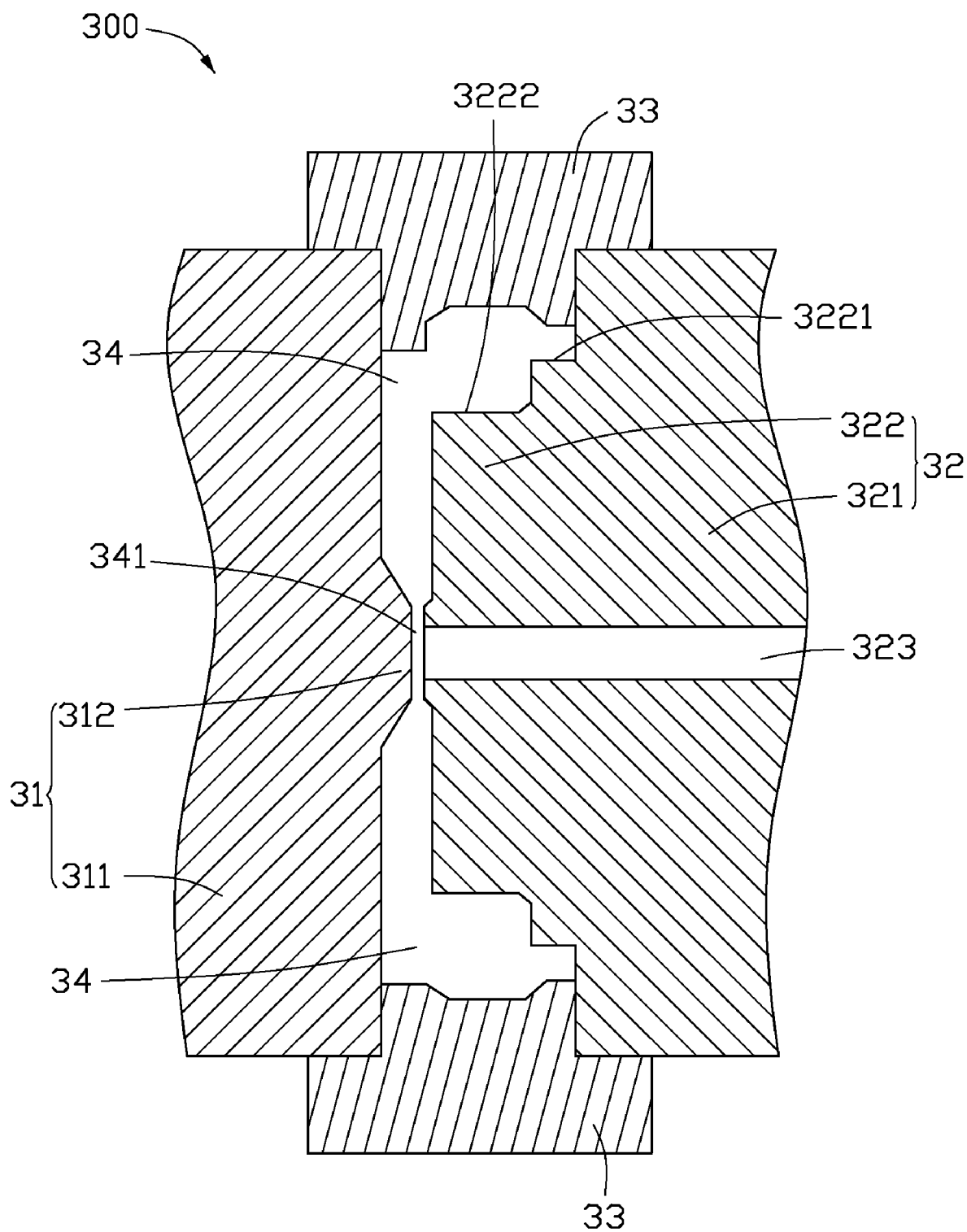
FIG. 1 is a sectional view of an injection mold, according to an exemplary embodiment.
Figure 2:
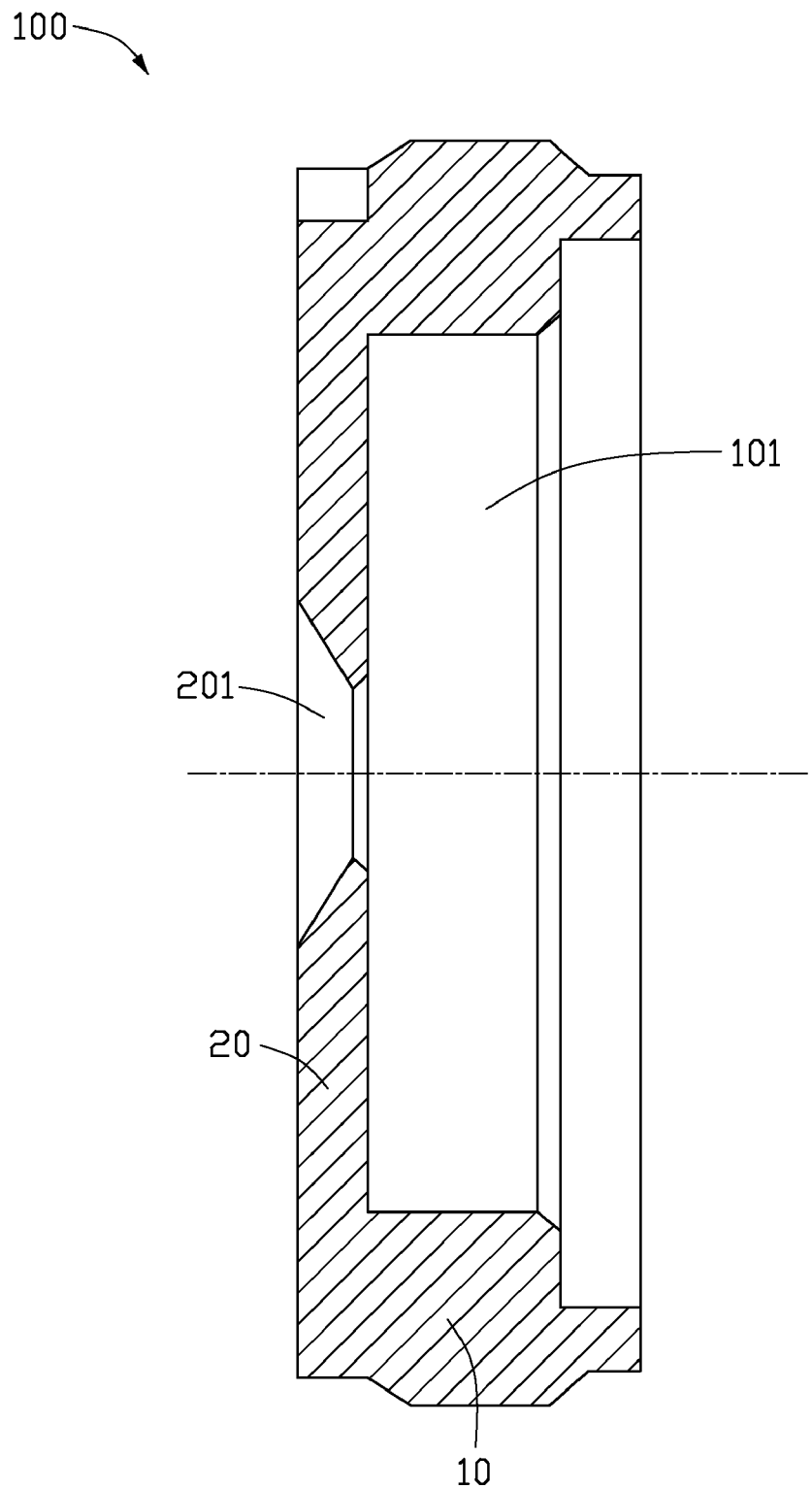
FIG. 2 is a sectional view of a typical lens barrel.

Referring to FIG. 1, an injection mold 300, according to an exemplary embodiment, is shown. The injection mold 300 includes a female die 31, a male die 32, and a screw die 33. The female die 31 and the male die 32 are correspondingly connected to two opposite ends of the screw die 33. The female die 31, the male die 32 and the screw die 33 cooperatively define a mold cavity 34 therebetween.

The female die 31 includes a female die plate 311 and a female die core 312 protruding from the female die plate 311. The female die core 312 is shaped as a truncated cone tapering in a direction away from the female die plate 311.

The male die 32 includes a male die plate 321 and a male die core 322 protruding from the male die plate 321. The male die core 322 includes a cylindrical first portion 3221 extending from the male die plate 321 and a cylindrical second portion 3222 extending from the first portion 3221. The diameter of the first portion 3221 is greater than that of the second portion 3222. When the female die 31 and the male die 32 are attached to each other. The female die core 312 faces the male die core 322. The male die 32 defines a through hole 323 passing through the male die core 322 and the male die plate 321 in communication with the mold cavity 34. The through hole 323 is configured for discharging air from the mold cavity 34.

An air gap 341 is formed between the female die core 312 and the male die core 322 and communicates with the mold cavity 34 and the through hole 323. In this embodiment, the air gap 341 is defined by spacing the female die core 312 and the male die core 322 apart from each other. In other alternative embodiments, the air gap 341 can be formed by defining a groove or grooves in the distal end of the female die core 312 and/or the male die core 322 communicating with the mold cavity 34 and the through hole 323. The distal ends of the female die core 312 and the male die core 322 contact each other.

The injection mold 300 further includes a sprue (not shown) and a runner (not shown) communicating with the sprue. The sprue and the runner are configured for introducing molding material into the mold cavity 34.

When using the injection mold 300 to mold a lens barrel, the air can be totally discharged out of the mold cavity 34 via the air gap 341 and the through hole 323 during injection of molding material into the mold cavity 34. Therefore, the light-incident hole of the lens barrel can be obtained as designed, resulting in quality imaging by a camera module with the obtained lens barrel.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An injection mold for molding a lens barrel, comprising:
   a female die comprising a female die plate and a female die core protruding from the female die plate,
   a male die comprising a male die plate and a male die core protruding from the male die plate, and
   a screw die for connecting to the female die and the male die;
   wherein, the female die, the male die and the screw die cooperatively define a mold cavity, the male die defines a through hole passing through the male die plate and the male die core, the distal end of the female die core faces the through hole, an air gap is formed between the distal ends of the female die core and the male die core and communicates with the mold cavity and the through hole, and the through hole and the air gap are configured for discharging air in the mold cavity during molding the lens barrel.

2. The injection mold of claim 1, wherein the female die core is shaped as a truncated cone tapering in a direction away from the female die plate.

3. The injection mold of claim 1, wherein the male die core comprises a cylindrical first portion extending from the male die plate and a cylindrical second portion extending from the first portion, and the diameter of the first portion is greater than that of the second portion.

4. The injection mold of claim 1, wherein the distal ends of the female die core and the male die core are spaced apart from each other.

5. The injection mold of claim 1, wherein the air gap is a groove in the distal end of at least one of the female die core and the male die core, and the distal ends of the female die core and the male die core contact each other.

6. The injection mold of claim 1, wherein the injection mold further comprises a sprue and a runner communicating with the sprue, and the sprue and the runner are configured for introducing molding material into the mold cavity.

* * * * *